United States Patent
Imamura et al.

(10) Patent No.: US 9,950,606 B2
(45) Date of Patent: Apr. 24, 2018

(54) START SYSTEM AND START CONTROL METHOD FOR INTERNAL COMBUSTION ENGINE OF HYBRID VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP); Yoshihito Kanno, Numazu (JP); Hiroki Morita, Hiratsuka (JP); Masaya Yamamoto, Kasugai (JP); Shunya Kato, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/501,042

(22) PCT Filed: Aug. 5, 2015

(86) PCT No.: PCT/IB2015/001319
§ 371 (c)(1),
(2) Date: Feb. 1, 2017

(87) PCT Pub. No.: WO2016/020743
PCT Pub. Date: Feb. 11, 2016

(65) Prior Publication Data
US 2017/0217302 A1    Aug. 3, 2017

(30) Foreign Application Priority Data

Aug. 6, 2014 (JP) .................................. 2014-160364

(51) Int. Cl.
*B60K 6/48* (2007.10)
*B60K 6/445* (2007.10)
(Continued)

(52) U.S. Cl.
CPC ................ *B60K 6/48* (2013.01); *B60K 6/445* (2013.01); *B60K 6/547* (2013.01); *B60W 10/06* (2013.01);
(Continued)

(58) Field of Classification Search
CPC .......... B60K 6/445; B60K 6/48; B60K 6/547; B60W 10/02; B60W 10/06; B60W 10/106; B60W 30/143
See application file for complete search history.

(56) References Cited

U.S. PATENT DOCUMENTS

2006/0003863 A1* 1/2006 Tabata .................. B60K 6/445
477/2
2009/0150019 A1* 6/2009 Sakamoto ........... B60W 30/188
701/34.4
(Continued)

FOREIGN PATENT DOCUMENTS

JP        2013-035528 A    2/2013
JP        2013-159260 A    8/2013

*Primary Examiner* — Hau V Phan
(74) *Attorney, Agent, or Firm* — Andrews Kurth Kenyon LLP

(57) ABSTRACT

The start system related to the present invention is for an internal combustion engine of a hybrid vehicle. The hybrid vehicle is configured to use at least one of a differential mechanism and a transmission gear mechanism to temporarily change an engine speed in starting of the internal combustion engine. The start system includes an electronic control unit. The electronic control unit is configured to determine a duration for which the engine speed needs to be changed in starting of the internal combustion engine. The electronic control unit is configured to determine a degree of change in the engine speed in starting of the internal combustion engine. The electronic control unit is configured to determine whether the engine speed needs to be changed (Continued)

by changing the gear position of the transmission gear mechanism based on the degree and the duration.

5 Claims, 15 Drawing Sheets

(51) Int. Cl.
*B60K 6/547* (2007.10)
*B60W 20/00* (2016.01)
*B60W 10/06* (2006.01)
*B60W 10/08* (2006.01)
*B60W 30/188* (2012.01)

(52) U.S. Cl.
CPC ............ *B60W 10/08* (2013.01); *B60W 20/00* (2013.01); *B60W 30/188* (2013.01)

(56) References Cited

U.S. PATENT DOCUMENTS

| 2010/0292904 | A1* | 11/2010 | Taguchi | B60W 30/143 701/93 |
| 2012/0089309 | A1* | 4/2012 | Kim | B60W 10/06 701/58 |
| 2012/0136506 | A1* | 5/2012 | Takeuchi | B60G 17/016 701/1 |
| 2014/0019021 | A1* | 1/2014 | Yanagida | B60W 10/02 701/54 |
| 2014/0129068 | A1* | 5/2014 | Higa | B60K 6/445 701/22 |
| 2015/0127200 | A1* | 5/2015 | Takeuchi | B60W 10/04 701/22 |
| 2015/0322872 | A1* | 11/2015 | Matsubara | B60K 6/445 701/22 |

* cited by examiner

FIG.2

|  | C1 | C2 | B1 | B2 | F1 |
|---|---|---|---|---|---|
| 1st | O |  |  | O | O |
| 2nd | O |  | O |  |  |
| 3rd | O | O |  |  |  |
| 4th |  | O | O |  |  |
| Rev | O |  |  | O |  |
| N |  |  |  |  |  |

O: ENGAGED

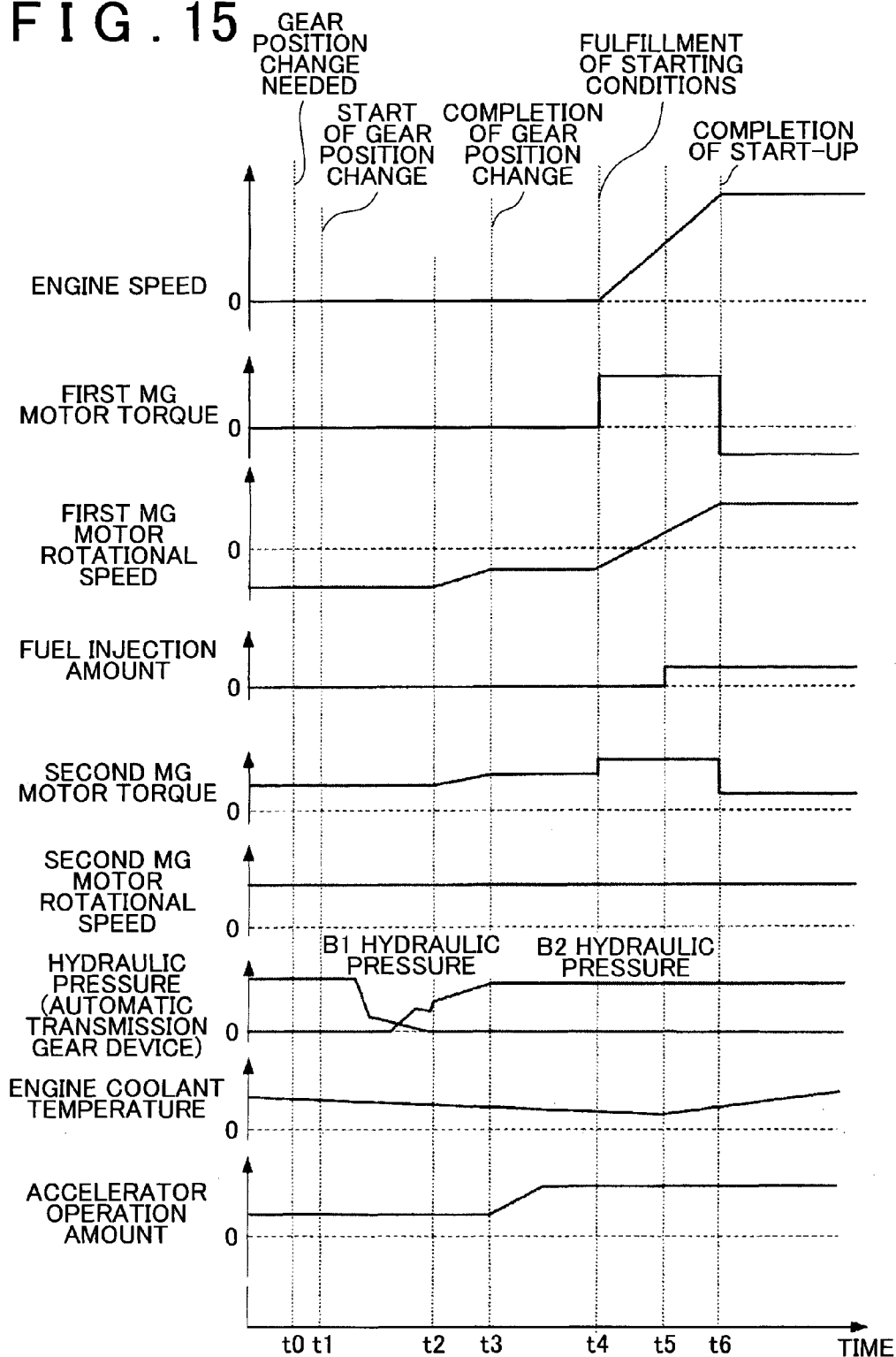

START SYSTEM AND START CONTROL METHOD FOR INTERNAL COMBUSTION ENGINE OF HYBRID VEHICLE

CROSS-REFERENCE TO RELATED APPLICATIONS

This is a national phase application based on the PCT International Patent Application No. PCT/IB2015/001319 filed Aug. 5, 2015, claiming priority to Japanese Patent Application No. 2014-160364 filed Aug. 6, 2014, the entire contents of both of which are incorporated herein by reference.

BACKGROUND OF THE INVENTION

1. Field of the Invention

The invention relates to a start system and a start control method for an internal combustion engine of a hybrid vehicle.

2. Description of Related Art

As a controller that is applied to a hybrid vehicle that is equipped with an automatic transmission gear device, a controller is known that changes the transmission gear ratio of the automatic transmission gear device before starting the internal combustion engine when there is a request to start the internal combustion engine (Japanese Patent Application Publication No. 2013-159260 (JP 2013-159260 A)). As another related art document that relates to the invention, there is Japanese Patent Application Publication No. 2013-35528 (JP 2013-35528 A).

Usually, in a hybrid vehicle, the engine speed and engine torque are determined so that the internal combustion engine can be operated in an optimum fuel efficiency condition. However, when the internal combustion engine is started in an optimum fuel efficiency condition when it has not been warmed up, the emission may be deteriorated. In particular, it is known that, in this situation, the number of particulate matters (PN: particulate number) increases.

To avoid such deterioration of emission, the controller of JP 2013-159260 A changes the gear position of the automatic transmission gear device to a low-speed side (engine high-speed side) before starting the internal combustion engine and returns the gear position of the automatic transmission gear device to the original gear position after the completion of warm-up of the internal combustion engine. This helps to prevent a decrease in transmission efficiency of the automatic transmission gear device. For example, when the gear position is changed from the second gear to the first gear in starting of the internal combustion engine, the gear position is changed from the second gear to the first gear and then to the second gear. When the period from start-up of the internal combustion engine to the completion of its warm-up is short, the gear position may be changed at frequent intervals and the user feels uncomfortable.

SUMMARY OF THE INVENTION

It is, therefore, an object of the invention to provide a start system or a start control method for an internal combustion engine (i.e. an engine) of a hybrid vehicle that can prevent complicated gear position changes when the internal combustion engine is started.

The start system related to the present invention is for an internal combustion engine of a hybrid vehicle. The hybrid vehicle includes an internal combustion engine, a differential mechanism, and a transmission gear mechanism. The internal combustion engine is connected to the differential mechanism. The transmission gear mechanism is provided in a power transmission path between the differential mechanism and driving wheels. The transmission gear mechanism is configured to be able to select one of a plurality of gear positions. The hybrid vehicle is configured to use at least one of the differential mechanism and the transmission gear mechanism to temporarily change an engine speed in starting of the internal combustion engine. The start system includes an electronic control unit. The electronic control unit is configured to determine a duration for which the engine speed needs to be changed in starting of the internal combustion engine. The electronic control unit is configured to determine a degree of change in the engine speed in starting of the internal combustion engine. The electronic control unit is configured to determine whether the engine speed needs to be changed by changing the gear position of the transmission gear mechanism based on the degree and the duration.

According to this start system, it is determined whether it is necessary to change the gear position of the transmission gear mechanism to change the engine speed, based on the degree of change in the engine speed and the duration of time required for changing the engine speed. For example, when the degree of change in the engine speed is small and the duration of time required for changing the engine speed is relatively short, it is determined that there is no need to change the gear position of the transmission gear mechanism to change the engine speed. In such a case, the engine speed can be changed only by the differential mechanism. It is, therefore, possible to avoid giving the user an uncomfortable feeling that results from the fact that the gear position of the transmission gear mechanism is changed a plurality of times within a short period of time as the duration is relatively short. This helps to improve the comfort of the hybrid vehicle.

The electronic control unit may be configured to determine the duration to be longer as an engine temperature of the internal combustion engine is lower. The emission is deteriorated as the engine temperature is lower. To prevent deterioration of emission, the engine speed needs to be changed for a longer period of time as the engine temperature is lower. According to this configuration, because the duration is set longer as the engine temperature is lower, deterioration of emission can be prevented effectively.

The electronic control unit may be configured, when it is determined that the engine speed needs to be changed by changing the gear position of the transmission gear mechanism, to determine one of the plurality of gear positions of the transmission gear mechanism as the gear position after the change of the engine speed, such that a combined transmission efficiency becomes the highest when the engine speed is changed in starting of the internal combustion engine. The combined transmission efficiency is a value that is obtained by combining the transmission efficiency of the differential mechanism and the transmission efficiency of the transmission gear mechanism. According to this configuration, a gear position that can provide the highest combined transmission efficiency while the engine speed is changed in its starting is selected. It is, therefore, possible to avoid selecting an inefficient gear position during starting of the engine. Thus, a decrease in fuel efficiency can be prevented.

A start control method related to the present invention is for an internal combustion engine of a hybrid vehicle. The hybrid vehicle includes an internal combustion engine, a differential mechanism, a transmission gear mechanism, and an electronic control unit. The internal combustion engine is connected to the differential mechanism. The transmission gear mechanism is provided in a power transmission path between the differential mechanism and driving wheels. The transmission gear mechanism is configured to be able to select one of a plurality of gear positions. The start control method includes: determining, by the electronic control unit, a duration for which an engine speed needs to be changed in starting of the internal combustion engine; determining, by the electronic control unit, a degree of change in the engine speed in starting of the internal combustion engine; determining, by the electronic control unit, whether the engine speed needs to be changed by changing the gear position of the transmission gear mechanism based on the degree and the duration and; temporarily changing the engine speed by the differential mechanism in starting of the internal combustion engine, when it is determined by the electronic control unit that there is no need to change the engine speed by changing the gear position of the transmission gear mechanism.

The start control method enables to avoid giving the user an uncomfortable feeling that results from the fact that the gear position of the transmission gear mechanism is changed a plurality of times within a short period of time as the duration is relatively short.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram that illustrates an operative engagement table of the automatic transmission gear device;

FIG. 15 is a timing chart that shows one example of control result.

DETAILED DESCRIPTION OF EMBODIMENTS

Figure 1:
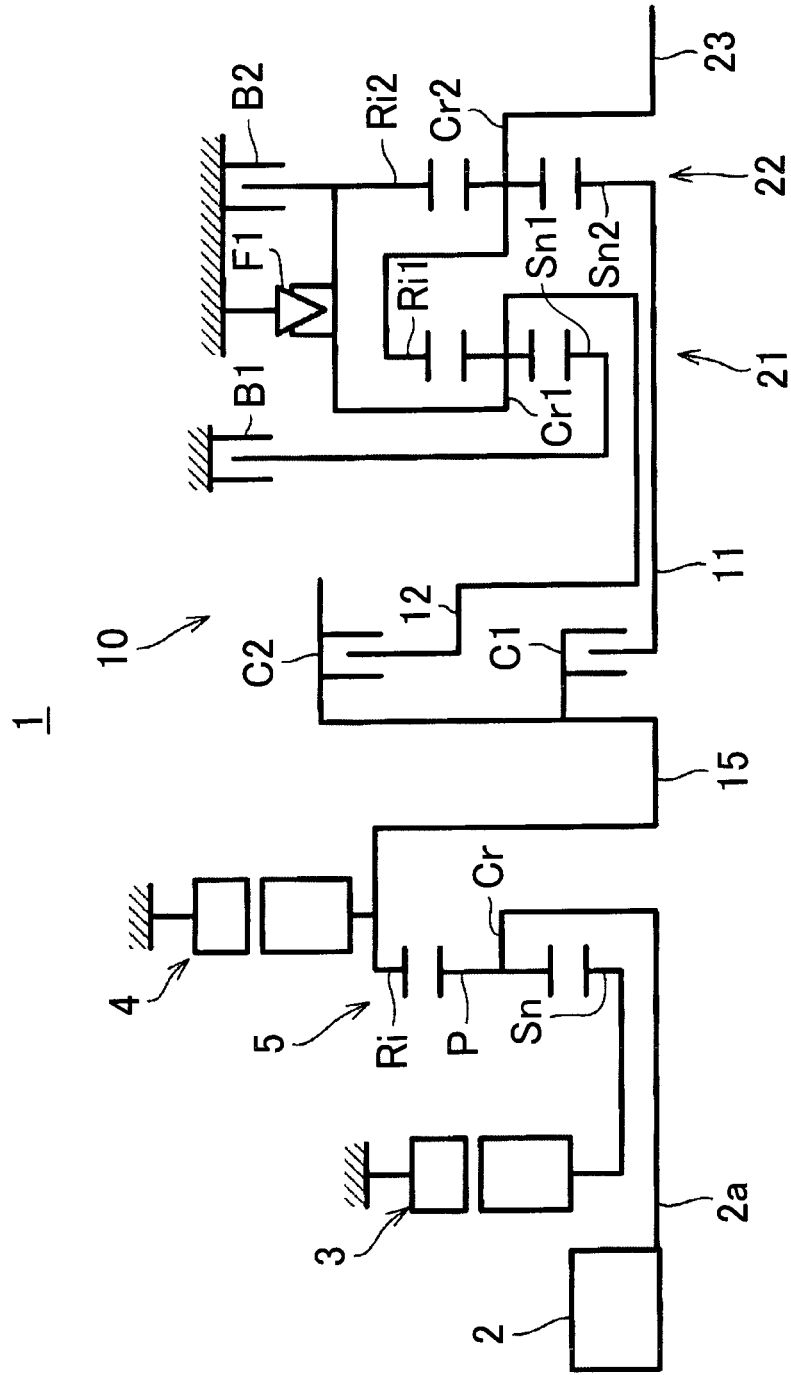
FIG. 1 is a diagram that illustrates the general configuration of a hybrid vehicle to which an internal combustion engine start controller according to one embodiment of the invention is applied.

As shown in FIG. 1, a vehicle 1 is constituted as what is called a hybrid vehicle that is equipped with an internal combustion engine 2 and two, first and second motor generators 3 and 4 as sources of dynamic power for traveling. The details of the internal combustion engine 2 (i.e. the engine) are described later. The internal combustion engine 2, the first motor generator 3 and the second motor generator 4 are connected to a power split mechanism 5 as a differential mechanism. The first motor generator and second motor generator are hereinafter referred to simply as "first motor" and "second motor," respectively. The power split mechanism 5 is constituted as a single-pinion planetary gear unit, and includes an external gear as a sun gear Sn, an internal gear as a ring gear Ri, and a carrier Cr that supports a pinion P in meshing engagement with the gears Sn and Ri for rotation about its own axis and revolution around the sun gear Sn. The first motor 3, the second motor 4 and an output shaft 2a of the internal combustion engine 2 are connected to the sun gear Sn, the ring gear Ri and the carrier Cr, respectively.

Figure 3:
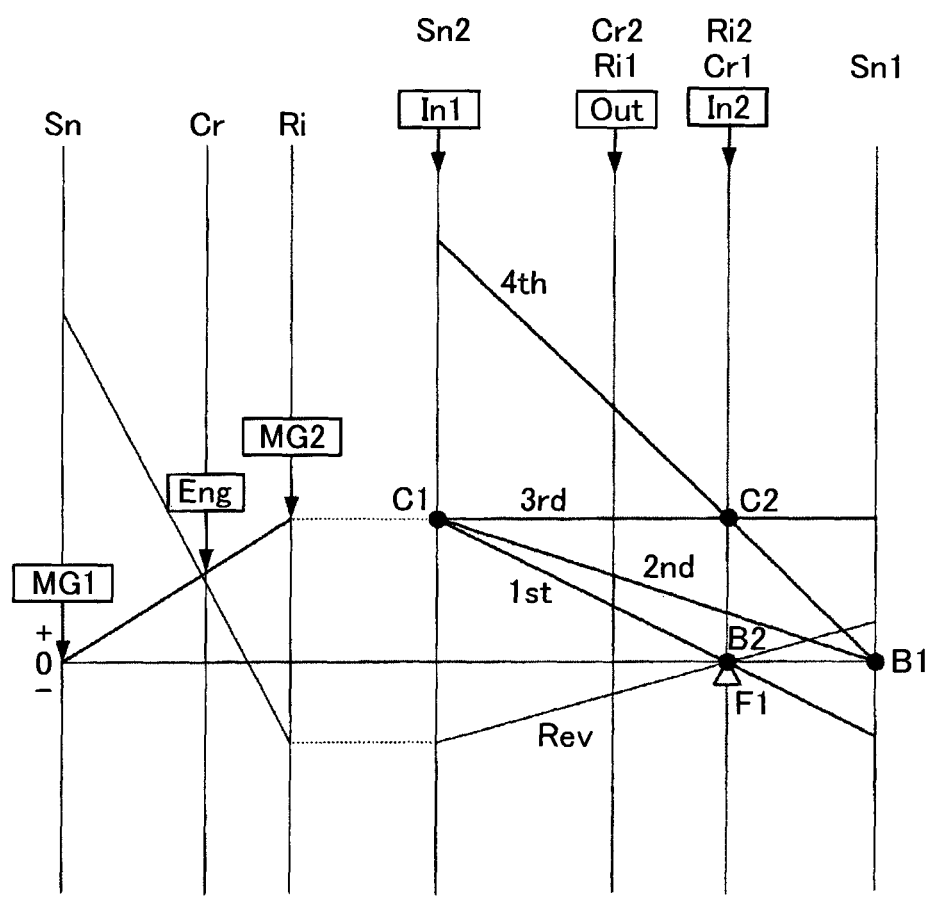
FIG. 3 is a diagram that illustrates a nomograph (velocity diagram) of each element of the vehicle of FIG. 1.

An automatic transmission gear device 10 as a transmission gear mechanism is provided in a power transmission path at a location closer to driving wheels than the second motor 4 is. The automatic transmission gear device 10 has two, first and second input shafts 11 and 12. Two clutches C1 and C2 are provided between the first and second input shafts 11 and 12 and an intermediate shaft 15 that rotates together with the ring gear Ri. By operating the clutches C1 and C2 appropriately, one of the two input shafts 11 and 12 can be selectively connected to the intermediate shaft 15. The automatic transmission gear device 10 is constituted by combining two sets of planetary gear units 21 and 22 and providing two brakes B1 and B2 and one one-way clutch F1. The two sets of planetary gear units 21 and 22 are combined with each other by connecting a carrier Cr1 of the planetary gear units 21 and a ring gear Ri2 of the planetary gear units 22 and connecting a ring gear Ri1 of the planetary gear units 21 and a carrier Cr2 of the planetary gear units 22. The first input shaft 11 and the second input shaft 12 are connected to a sun gear Sn2 and the carrier Cr1, respectively. The carrier Cr2 is connected to an output shaft 23. The one-way clutch F1, which allows rotation in one direction only, is provided between the carrier Cr1 and the ring gear Ri2, which are connected to each other. The vehicle 1 can select one gear position from a plurality of gear positions that consists of four forward gears and one reverse gear as shown in an operative engagement table in FIG. 2 by appropriately changing the operating conditions of the clutches C1 and C2 and the brakes B1 and B2 with a hydraulic system (not shown). The "N" in FIG. 2 means neutral. The transmission gear ratio (gear ratio) of each gear position is 3.20 for the first gear (1st), 1.72 for the second gear (2nd), 1.00 for the third gear (3rd), 0.67 for the fourth gear (4th), and 2.04 for the reverse gear (Rev). The symbol "○" in FIG. 2 means that the corresponding clutch or brake is engaged. The nomograph (velocity diagram) of each element of the vehicle 1 at a time when each of the first to fourth gears is selected is as shown in FIG. 3. The "Eng," "MG1," "MG2," "In1," "In2" and "Out" in FIG. 3 represent the internal combustion engine 2, the first motor 3, the second motor 4, the first input shaft 11, the second input shaft 12 and the output shaft 23, respectively.

Figure 4:
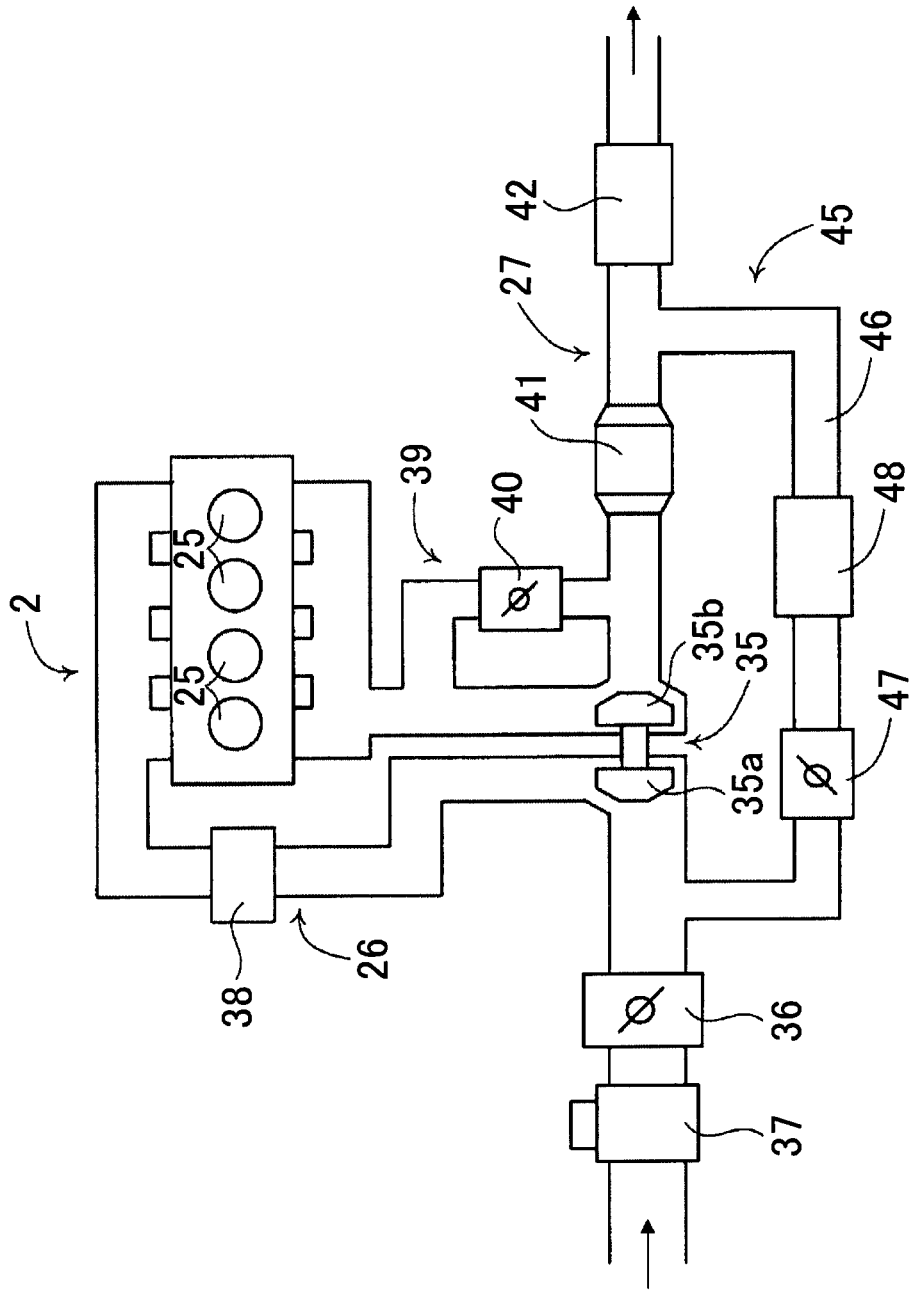
FIG. 4 is an overall configuration diagram of the internal combustion engine.

As shown in FIG. 4, the internal combustion engine 2 is constituted as an in-line four-cylinder spark-ignition internal combustion engine and has four cylinders 25 that are arranged in line. The internal combustion engine 2 is constituted as what is called a lean burn engine and can switch the operation mode between a lean combustion mode and a stoichiometric combustion mode. The lean combustion mode is an operation mode in which an air-fuel ratio that is set on the leaner side than the theoretical air-fuel ratio is aimed at. The stoichiometric combustion mode is an operation mode in which the theoretical air-fuel ratio, which is on the richer side than the air-fuel ratio in the lean combustion mode or an air-fuel ratio close to the theoretical air-fuel ratio is aimed at. The switching from the lean combustion mode to the stoichiometric combustion mode is achieved by temporarily increasing the fuel injection amount in view of the delay in response of the intake air amount.

Figure 5:
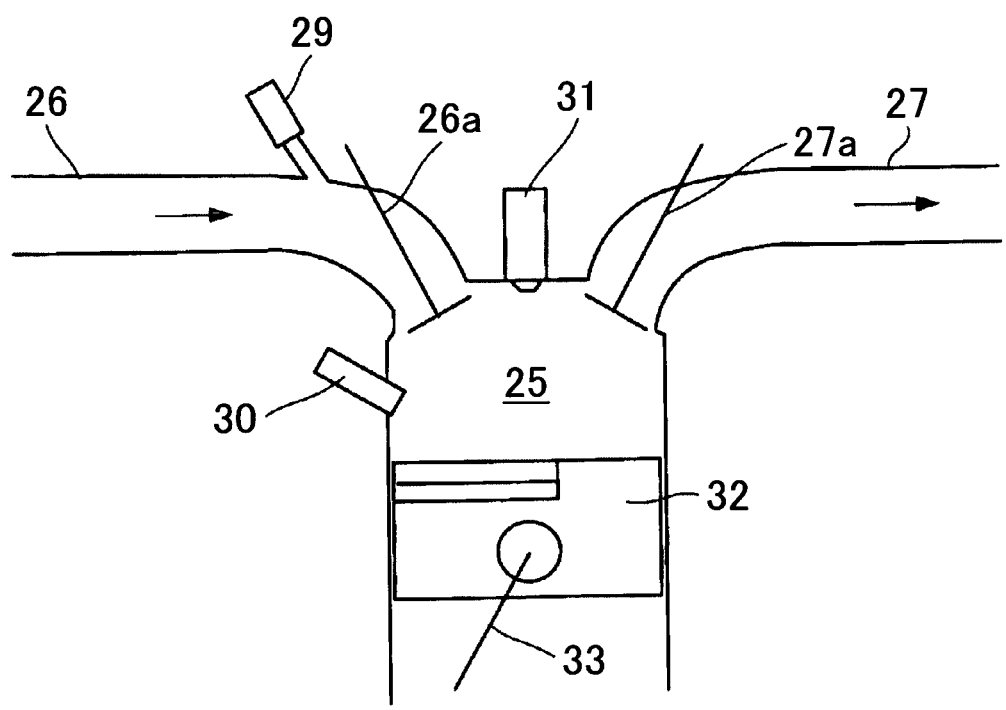
FIG. 5 is an outline diagram of the internal configuration of the internal combustion engine.

As shown in FIG. 4 and FIG. 5, an intake passage 26 and an exhaust passage 27 are connected to the cylinders 25 of the internal combustion engine 2. The intake passage 26 and the exhaust passage 27 are opened and closed by an intake valve 26a and an exhaust valve 27a, respectively. Fuel is supplied to each cylinder 25 by a port injection injector 29 or in-cylinder injection injector 30, and the air-fuel mixture that is introduced into the cylinder 25 is ignited by a spark plug 31 that is provided for each cylinder 25. The energy that is produced by combustion of air-fuel mixture is transmitted to a piston 32, and output to the output shaft 2a via a connecting rod 33.

As shown in FIG. 4, the internal combustion engine 2 is equipped with a turbocharger 35 that uses energy of exhaust gas to supercharge the cylinders 25. The turbocharger 35 has a compressor 35a that is provided in the intake passage 26. A throttle valve 36 that can adjust the intake air amount is provided upstream of the compressor 35a in the intake passage 26. An air flow meter 37 that outputs a signal based on the intake air amount is provided upstream of the throttle valve 36 in the intake passage 26. An intercooler 38 that cools the intake air that has been pressurized by the compressor 35a is provided downstream of the compressor 35a in the intake passage 26.

The turbocharger 35 has a turbine 35b that is provided in the exhaust passage 27. The exhaust passage 27 has a waste gate valve mechanism 39 that bypasses some of exhaust gas from the upstream of the turbine 35b to the downstream of the turbine 35b. The waste gate valve mechanism 39 has a waste gate valve 40 that can adjust the flow rate of exhaust gas that is directed to the turbine 35b. Thus, by controlling the opening of the waste gate valve 40, the flow rate of exhaust gas that flows into the turbine 35b is adjusted and, consequently, the supercharging pressure in the internal combustion engine 2 is adjusted. The exhaust gas that has passed through the turbine 35b or the waste gate valve 40 is passed through a start converter 41 and an aftertreatment device 42 to remove harmful substances before it is discharged into the atmosphere.

The internal combustion engine 2 is equipped with an EGR device 45 that extracts a portion of exhaust gas from the exhaust passage 27 and recirculates it into the intake passage 26 as EGR gas. The EGR device 45 includes an EGR passage 46 through which a portion of exhaust gas is extracted from the exhaust passage 27 as EGR gas and directed into the intake passage 26, an EGR valve 47 that can adjust the flow rate of the EGR gas that flows through the EGR passage 46, and an EGR cooler 48 that cools the EGR gas that flows through the EGR passage 46. The EGR passage 46 connects the exhaust passage 27 with the intake passage 26. The exhaust passage 27 is placed between the start converter 41 and the aftertreatment device 42, and the intake passage 26 is placed between the compressor 35a and the throttle valve 36.

Figure 6:
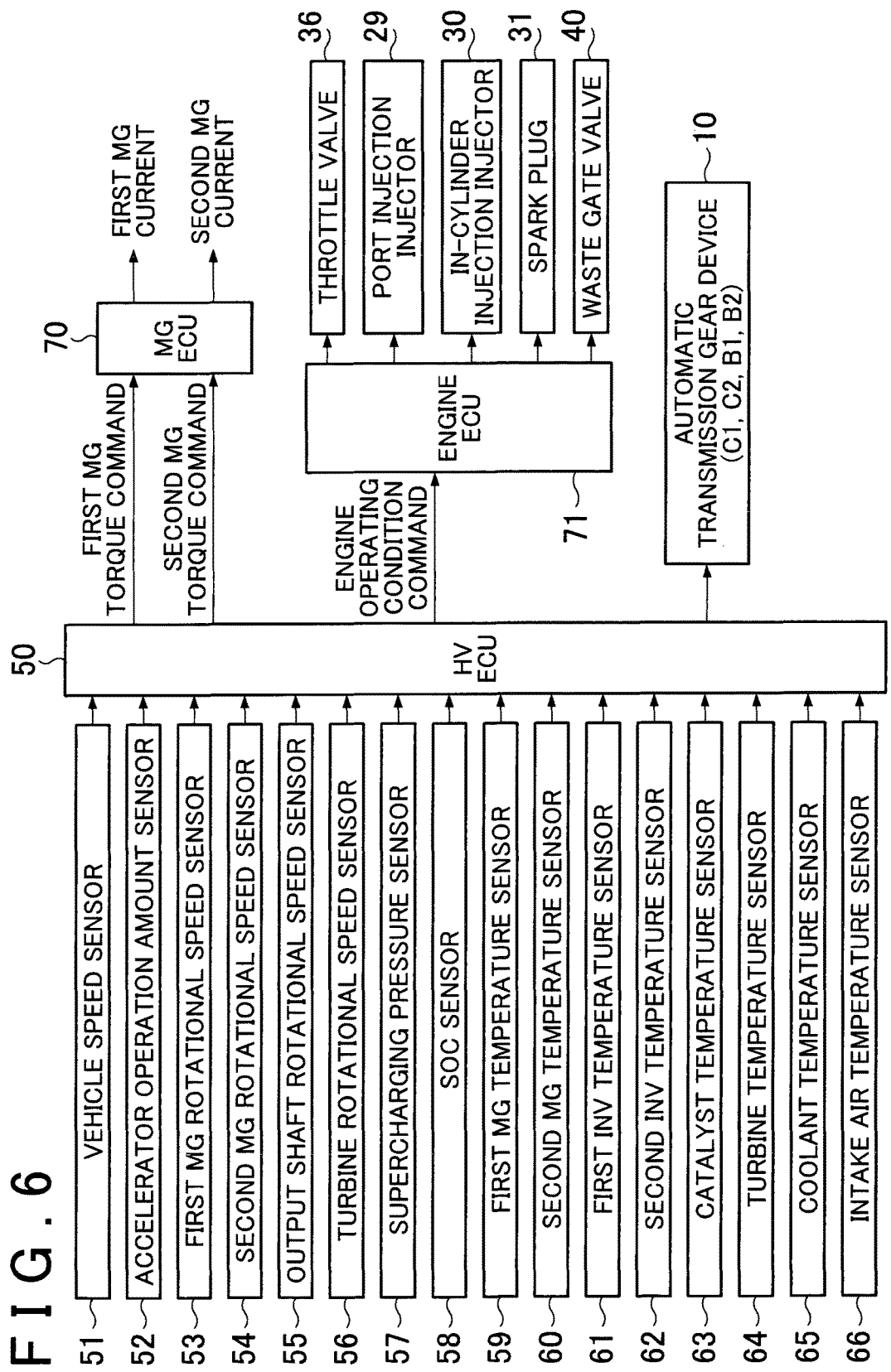
FIG. 6 is a block diagram that illustrates a control system of the vehicle of FIG. 1.

As shown in FIG. 6, each part of the vehicle 1 is controlled by various electronic control units 50 (HV ECU 50), 70 (MG ECU 70) and 71 (engine ECU 71) that are constituted as computers that are dedicated to specific functions. The HV ECU 50, the MG ECU 70 and the engine ECU 71 are electrically connected in such a manner that they can exchange information with each other.

Signals from various sensors are input into the HV ECU 50, which is provided as a primary computer. For example, output signals from a vehicle speed sensor 51 that outputs a signal based on the vehicle speed of the vehicle 1, an accelerator operation amount sensor 52 that outputs a signal based on the amount of depression of an accelerator pedal (not shown), a first MG rotational speed sensor 53 that outputs a signal based on the rotational speed of the first motor 3, a second MG rotational speed sensor 54 that outputs a signal based on the rotational speed of the second motor 4, an output shaft rotational speed sensor 55 that outputs a signal based on the rotational speed of the output shaft 23 of the automatic transmission gear device 10, a turbine rotational speed sensor 56 that outputs a signal based on the rotational speed of the turbine 35b of the turbocharger 35, a supercharging pressure sensor 57 that outputs a signal based on the supercharging pressure in the internal combustion engine 2, an SOC sensor 58 that outputs a signal based on the state of charge of a battery (not shown), a first MG temperature sensor 59 that outputs a signal based on the temperature of the first motor 3, a second MG temperature sensor 60 that outputs a signal based on the temperature of the second motor 4, a first INV temperature sensor 61 that outputs a signal based on the temperature of a first inverter (not shown) that is provided for the first motor 3, a second INV temperature sensor 62 that outputs a signal based on the temperature of a second inverter (not shown) that is provided for the second motor 4, a catalyst temperature sensor 63 that outputs a signal based on the temperature of the aftertreatment device 42, a turbine temperature sensor 64 that outputs a signal based on the temperature of the turbine 35b of the turbocharger 35, a coolant temperature sensor 65 that outputs a signal based on the temperature of engine coolant in the internal combustion engine 2, an intake air temperature sensor 66 that outputs a signal based on the intake air temperature in the internal combustion engine 2, and so on are input into the HV ECU 50.

The HV ECU 50 calculates the amounts of torque that the first motor 3 and the second motor 4 are required to generate and outputs commands concerning the amounts of torque to the MG ECU 70. Also, the HV ECU 50 determines the operating conditions of the internal combustion engine 2, and outputs a command concerning the operating conditions of the internal combustion engine 2 to the engine ECU 71. In addition, the HV ECU 50 controls the clutches C1 and C2 and the brakes B1 and B2 of the automatic transmission gear device 10 so that a gear position that meets a predetermined shift schedule or request from the driver or the like can be achieved. The MG ECU 70 calculates the currents corresponding to the amounts of torque that the first motor 3 and the second motor 4 are required to generate based on commands that are received from the HV ECU 50, and outputs the currents to the first motor 3 and the second motor 4. The engine ECU 71 performs various control operations on various parts of the internal combustion engine 2, such as the throttle valve 36, the port injection injector 29, the in-cylinder injection injector 30, the spark plug 31 and the waste gate valve 40, based on a command that is received from the HV ECU 50.

The HV ECU 50 calculates a requested power that is requested by the driver with reference to the output signal from the accelerator operation amount sensor 52 and the output signal from the vehicle speed sensor 51. The HV ECU 50 controls the vehicle 1 by switching various modes so that the requested power can be achieved with an optimum system efficiency. For example, in a low load region in which the heat efficiency of the internal combustion engine 2 decreases, an EV traveling mode in which the combustion in the internal combustion engine 2 is stopped and the second motor 4 is driven is selected. When the torque that is generated only by the internal combustion engine 2 is insufficient, a hybrid traveling mode in which the second motor 4 is also used as a travelling drive source together with the internal combustion engine 2 is selected.

Figure 7:
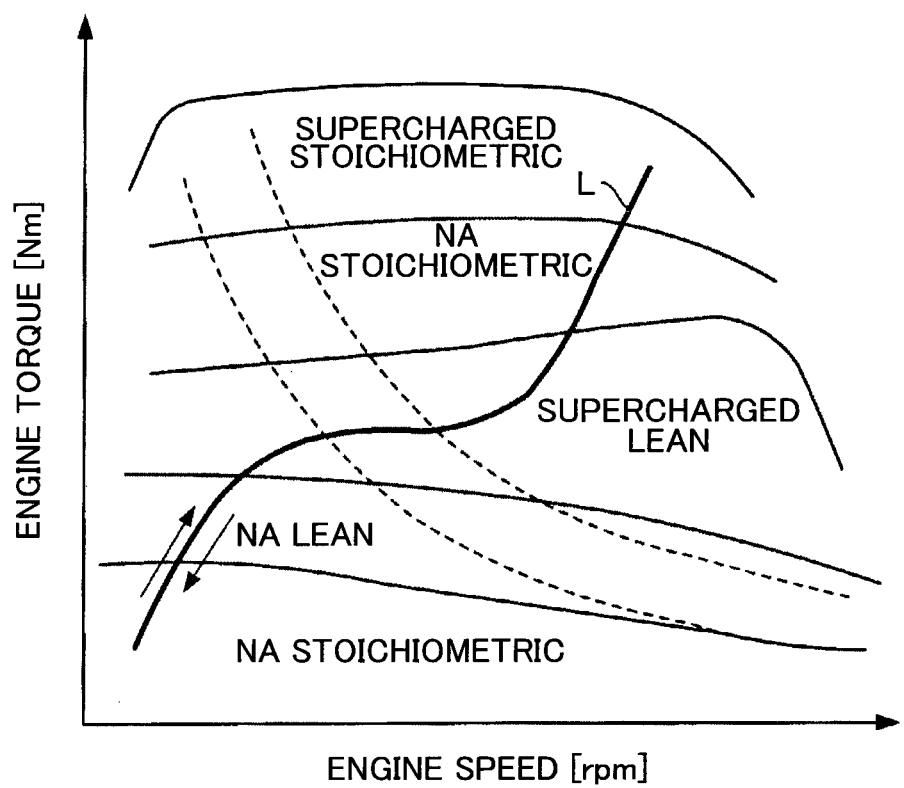
FIG. 7 is an explanatory view that describes the operating point and operating ranges of the internal combustion engine.

When the hybrid traveling mode is selected, the motor torque of the first motor 3 and so on are controlled so that the operating point of the internal combustion engine 2 can move along an optimum fuel efficiency curve L as indicated by arrows in FIG. 7. The operating point of the internal combustion engine 2 is defined by the engine speed and the engine torque, and the optimum fuel efficiency curve L is set in advance so that the heat efficiency of the internal combustion engine 2 can be optimum. The internal combustion engine 2 of this embodiment is constituted as a lean burn engine that is equipped with a supercharger. Thus, the internal combustion engine 2 selects a natural aspiration stoichiometric combustion mode, natural aspiration lean combustion mode, supercharged stoichiometric combustion mode or supercharged lean combustion mode as its operation mode according to the operating ranges that are shown in FIG. 7.

This embodiment is characterized by the start control of the internal combustion engine 2 that is performed when there is a request to start the internal combustion engine 2 while the EV traveling mode is in progress. As described above, the internal combustion engine 2 of this embodiment is basically operated according to the optimum fuel efficiency curve L. Thus, when the internal combustion engine 2 is started in the EV traveling mode, it is preferred, from the standpoint of heat efficiency, that the operating point be located on the optimum fuel efficiency curve L in starting of the internal combustion engine 2, i.e., fuel efficiency. It is, however, known that the PN increases, when the internal combustion engine 2 is operated according to the optimum fuel efficiency curve L and the internal combustion engine 2 has not been warmed up. Thus, in this embodiment, the internal combustion engine 2 is started according to the control routine that is described below to prevent the increase of PN.

Figure 8:
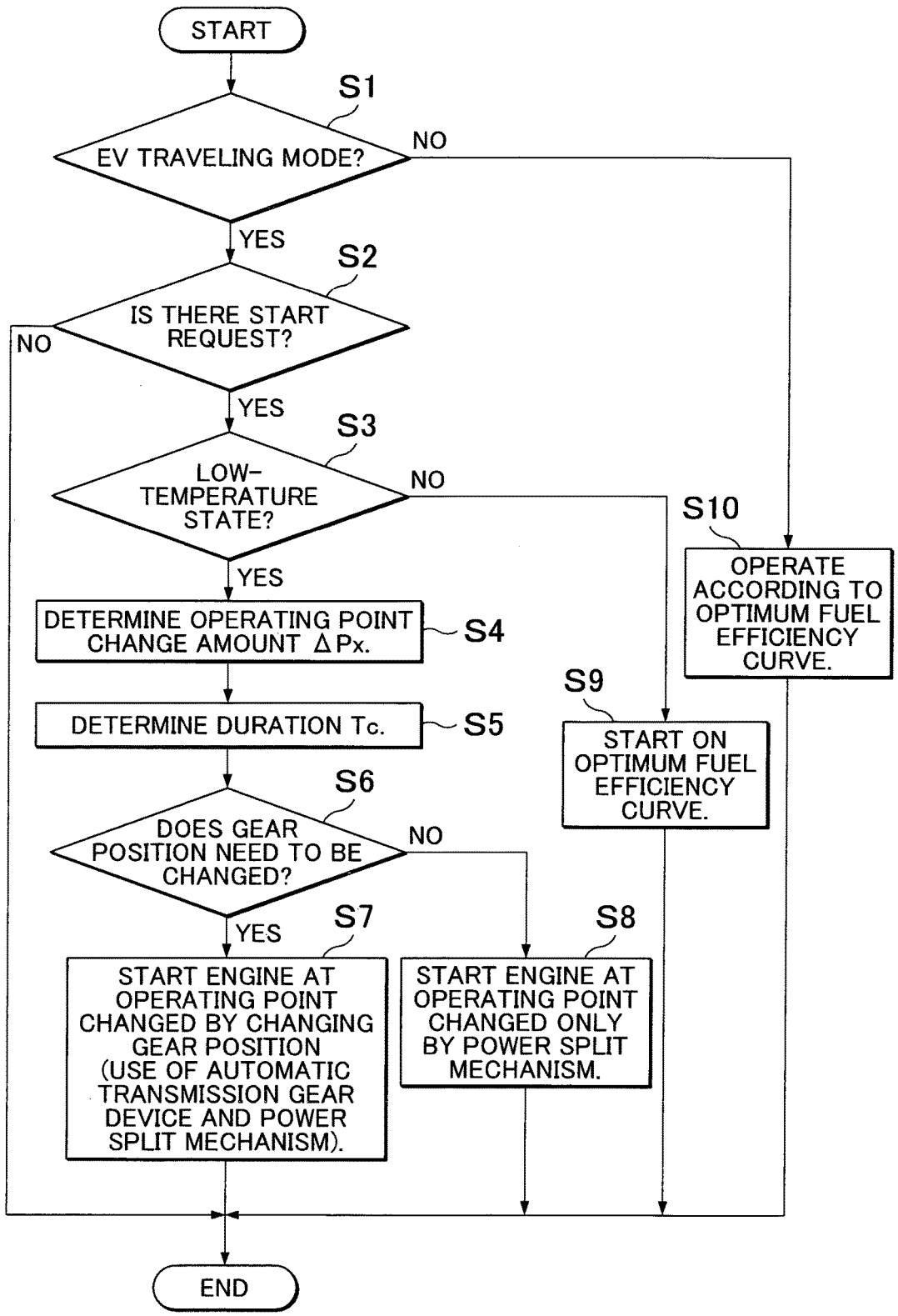
FIG. 8 is a flowchart that shows one example of control routine.

The control routine that is shown in FIG. 8 is stored in the HV ECU 50, and is read out on a timely basis and repeatedly executed at predetermined intervals. In step S1, the HV ECU 50 determines whether the current traveling mode is the EV traveling mode. If the current traveling mode is the EV traveling mode, the processing advances to step S2. Otherwise, i.e., if the current traveling mode is the hybrid traveling mode, the processing advances to step S10. The HV ECU 50 operates the internal combustion engine 2 in such a way that the operating point of the internal combustion engine 2 moves on the optimum fuel efficiency curve L (FIG. 7).

In step S2, the HV ECU 50 determines whether there is a request to start the internal combustion engine 2. If there is a start request, the processing advances to step S3. Otherwise, the subsequent processing is skipped and the current routine is terminated. In step S3, the HV ECU 50 acquires the temperature of engine coolant (engine coolant temperature) as the engine temperature of the internal combustion engine 2 with reference to a signal from the coolant temperature sensor 65 (FIG. 6). The HV ECU 50 determines whether the internal combustion engine 2 is in a low-temperature state. It should be noted that the temperature of engine oil (engine oil temperature) may be used as the engine temperature. The HV ECU 50 determines that the internal combustion engine 2 is in a low-temperature state if the engine coolant temperature is equal to or lower than a predetermined value (low-temperature determination value), and determines that the internal combustion engine 2 is not in a low-temperature state if the engine coolant temperature is higher than the low-temperature determination value. If the internal combustion engine 2 is in a low-temperature state, the processing advances to step S4. If the internal combustion engine 2 is not in a low-temperature state, the processing advances to step S9, and the internal combustion engine 2 is started such that the operating point will be located on the optimum fuel efficiency curve L in starting of the internal combustion engine 2.

Figure 9:
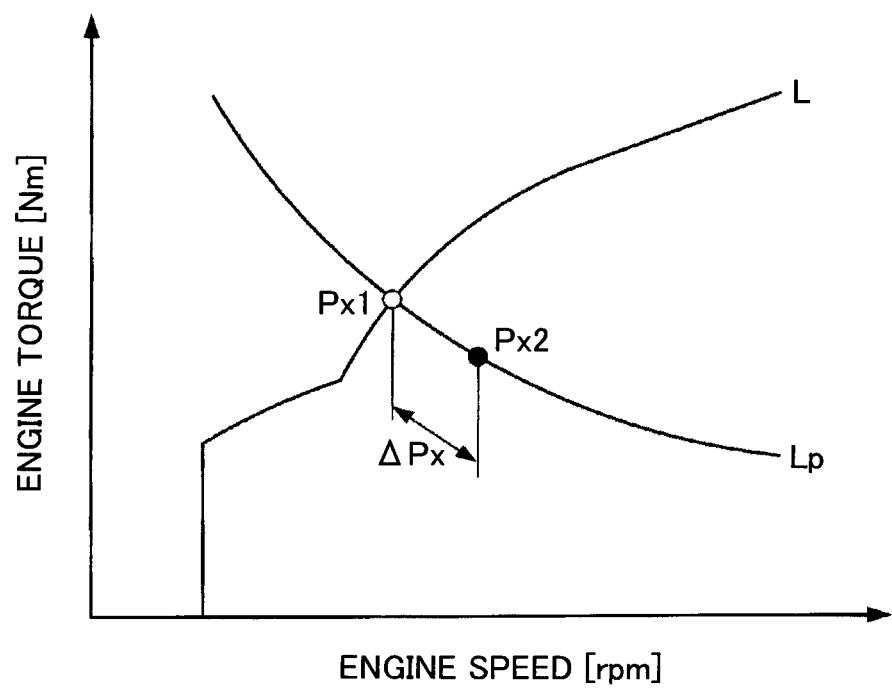
FIG. 9 is an explanatory view that describes an operating point change amount.
Figure 10:
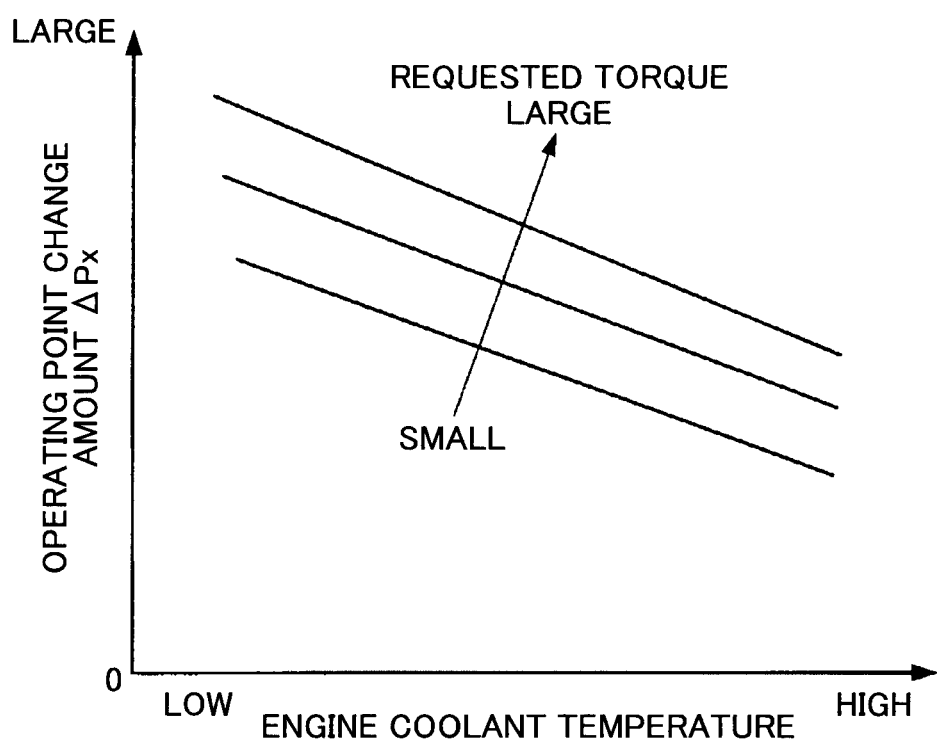
FIG. 10 is a diagram that illustrates one example of a map that is used to obtain the operating point change amount.

In step S4, the HV ECU 50 determines an operating point change amount by which the operating point needs to be changed in starting of the internal combustion engine 2. As shown in FIG. 9, the operating point change amount $\Delta Px$ is defined by the engine speed and engine torque, and is determined so that the engine speed can increase from the value before the change. The operating point change amount $\Delta Px$ can be defined as the distance between an operating point Px1 on the optimum fuel efficiency curve L and an operating point Px2 on an equal-power line Lp. The optimum fuel efficiency curve L satisfies the requested power that will be required in starting of the internal combustion engine 2. The equal-power line Lp passes through the operating point Px1 and is located on the high-speed low-torque side relative to the operating point Px1. The operating point change amount $\Delta Px$ corresponds to the "degree in change of the engine speed" according to the invention. As shown in FIG. 10, the operating point change amount $\Delta Px$ is determined based on the engine coolant temperature and the requested torque (requested power) that will be required in starting of the internal combustion engine 2. The HV ECU 50 acquires the current engine coolant temperature and the requested torque, and determines the operating point change amount $\Delta Px$ based on a map in FIG. 10 such that the operating point change amount $\Delta Px$ can have a greater value as the engine coolant temperature is lower and as the requested torque is higher. It should be noted that changing the operating point in this embodiment corresponds to changing the engine speed in the invention.

Figure 11:
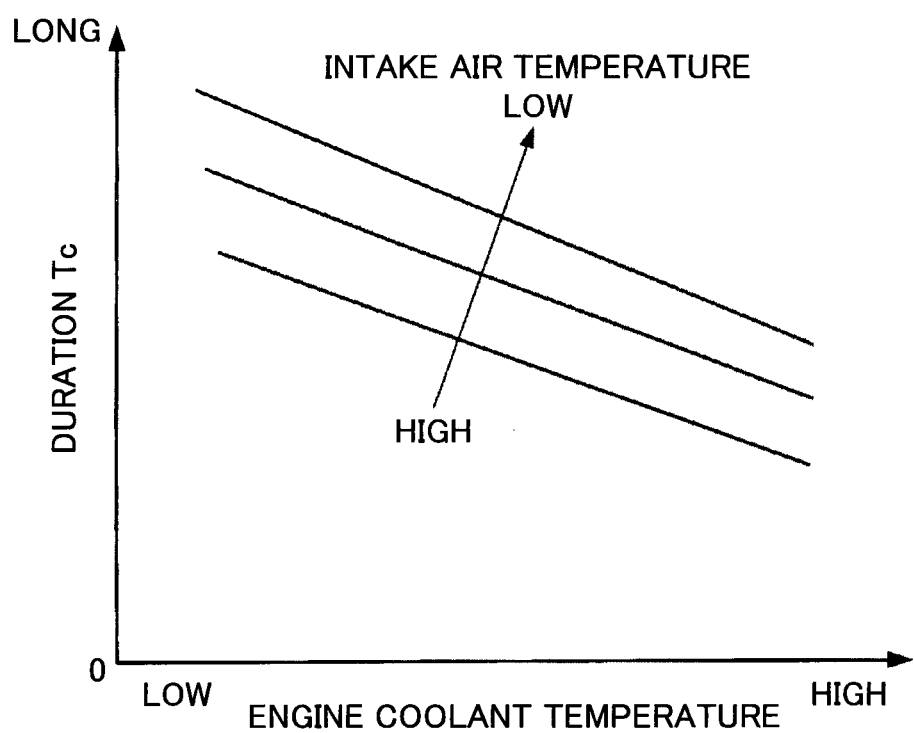
FIG. 11 is a diagram that illustrates one example of a map that is used to obtain a duration.

In step S5, the HV ECU 50 determines a duration Tc for which the operating point needs to be changed in starting of the internal combustion engine 2. As shown in FIG. 11, the duration Tc is determined based on the engine coolant temperature and the intake air temperature. The HV ECU 50 acquires the engine coolant temperature and the intake air temperature, and determines the duration Tc based on a map in FIG. 11 so that the duration Tc can have a greater value as the intake air temperature is lower and as the engine coolant temperature is lower. The intake air temperature is acquired based on a signal from the intake air temperature sensor 66.

In step S6, the HV ECU 50 determines whether the gear position of the automatic transmission gear device 10 needs to be changed to achieve the change in operating point (engine speed) in starting of the internal combustion engine 2. The operating point of the internal combustion engine 2 can be changed using either the power split mechanism 5 or the automatic transmission gear device 10. However, when the power split mechanism 5 is used, the changeable amount of the operating point is limited by various conditions including the limit rotational speed of the pinion P, the limit rotational speed of the first motor 3 and the limit rotational speed of the second motor 4. Thus, when the operating point change amount ΔPx that is determined in step S4 exceeds the changeable amount, the change in operating point cannot be achieved only by the power split mechanism 5. Thus, in such a case, the gear position of the automatic transmission gear device 10 needs to be changed to the low-speed side (high engine speed side) and the first motor 3 and so on need to be operated to change the transmission gear ratio of the power split mechanism 5. In addition, when the gear position of the automatic transmission gear device 10 is changed to change the operating point of the internal combustion engine 2, the gear position needs to be changed to the low-speed side and then returned to the original position after the elapse of the duration Tc. Thus, as the duration Tc is shorter, the intervals between changes of the gear position of the automatic transmission gear device 10 decrease and the user is more likely to feel uncomfortable with the complicated changes of the gear position. Thus, to reduce user discomfort, it is preferable to change the operating point only by the power split mechanism 5 when the duration Tc is relatively short, as much as possible.

For this reason, in step S6, the HV ECU 50 determines that there is no need to change the gear position of the automatic transmission gear device 10 when the duration Tc is shorter than a threshold value as a reference level below which the user feels uncomfortable (for example, the threshold value is set to several seconds) and the operating point change amount ΔPx does not exceed the changeable amount. Then, the HV ECU 50 advances the processing to step S8, and adjusts the transmission gear ratio of the power split mechanism 5 by operating the first motor 3 and so on to change the operating point of the internal combustion engine 2 by an amount corresponding to the operating point change amount ΔPx before starting the internal combustion engine 2.

On the other hand, when the operating point change amount ΔPx exceeds the changeable amount, it is impossible to change the operating point only by the power split mechanism 5. In this case, the HV ECU 50 determines that the gear position of the automatic transmission gear device 10 needs to be changed regardless of the length of the duration Tc. Then, the HV ECU 50 advances the processing to step S7, and changes the operating point of the internal combustion engine 2 by an amount corresponding to the operating point change amount ΔPx using both of the power split mechanism 5 and the automatic transmission gear device 10 before starting the internal combustion engine 2. In step S7 and step S8, the internal combustion engine 2 is started by firing it up after motoring the internal combustion engine 2 to adjust it to an engine speed corresponding to the operating point after the change. It should be noted that the internal combustion engine 2 may be started by firing it up after changing the engine speed of the internal combustion engine 2 to a level at which it can be fired up and then changing the operating point of the internal combustion engine 2 to a target point.

Figure 12:
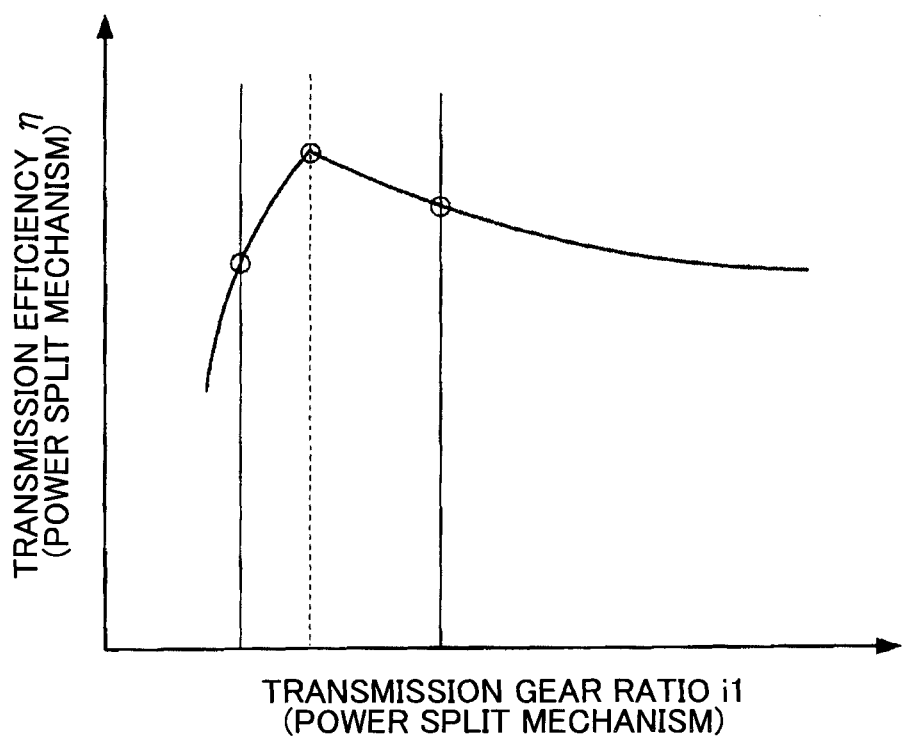
FIG. 12 is a diagram that illustrates the transmission efficiency of a power split mechanism.
Figure 13:
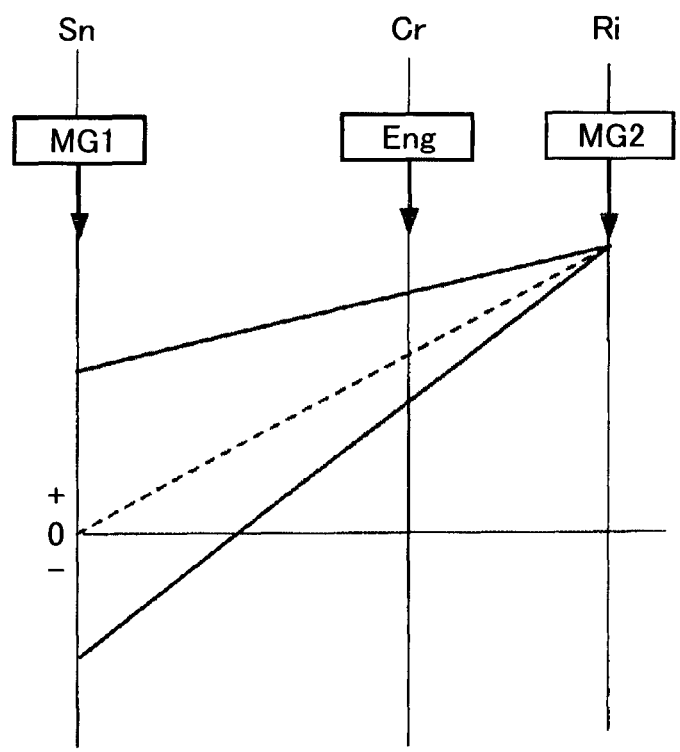
FIG. 13 is a diagram that illustrates a velocity diagram of the power split mechanism.
Figure 14:
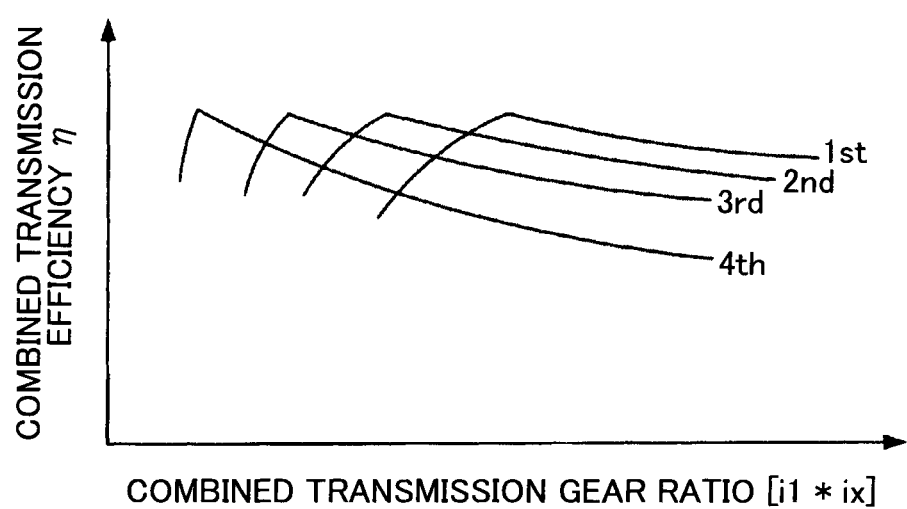
FIG. 14 is a diagram that illustrates a combined transmission efficiency.

The operating point is changed using the power split mechanism 5 and the automatic transmission gear device 10 in step S7. At this time, the gear position of the automatic transmission gear device 10 is determined so that a combined transmission efficiency that is obtained by combining the transmission efficiencies of the power split mechanism 5 and the automatic transmission gear device 10 can be the highest. As shown in FIG. 12, the transmission efficiency η1 of the power split mechanism 5 changes depending on the transmission gear ratio i1, and has an inverted-V shape that has a peak when the rotational speed of the sun gear Sn is 0 rpm. As shown in a velocity diagram in FIG. 13, when the rotational speed of the sun gear Sn is 0 rpm, the transmission efficiency at the time is the maximum and corresponds to the peak of the curve in FIG. 12 because no power is generated by the first motor 3, which is connected to the sun gear Sn. On the other hand, because the transmission efficiency of the automatic transmission gear device 10 is different for each gear position, the combined transmission efficiency η, which is obtained by combining the transmission efficiency η1 of the power split mechanism 5 and the transmission efficiency of the automatic transmission gear device 10, has different inverted-V shapes depending on the gear position as shown in FIG. 14. The automatic transmission gear device 10 has transmission gear ratios ix (x=1, 2, 3, 4) that are set in advance for each of the gear positions as described before.

When the processing in step S7 of FIG. 8 is executed as there is a request to start the internal combustion engine 2 while the EV traveling mode is in progress, it is necessary to maintain the vehicle speed before and after the change in operating point. Thus, the rotational speed of the ring gear Ri of the power split mechanism 5 (the rotational speed of the second motor 4) is uniquely determined for each gear position of the automatic transmission gear device 10 (refer to FIG. 3). The operating point (engine speed) after the change is determined based on the operating point change amount ΔPx that is determined in step S4. Thus, the rotational speed of the sun gear Sn is automatically determined. Then, the transmission gear ratio of the power split mechanism 5, i.e., the ratio of the rotational speed of the ring gear Ri to the engine speed, after the change in operating point of the internal combustion engine 2 is determined. As a result, because the combined transmission efficiency η corresponding to the transmission gear ratio of the power split mechanism 5 can be obtained for each gear position, a gear position with which the combined transmission efficiency η will be the highest is determined from among the combined transmission efficiencies η that are obtained for each gear position as the gear position after the change in operating point. This helps to avoid a decrease in transmission efficiency that results from a change to an inefficient gear position in starting of the internal combustion engine 2 and, consequently, a decrease in fuel efficiency can be prevented.

In the control routine in FIG. 8, the HV ECU 50 functions as duration determine means according to the invention by executing step S5, as gear position change necessity determine means according to the invention by executing step S6, and as change control means according to the invention by executing step S7.

The change with time in each parameter in a case where the gear position of the automatic transmission gear device 10 is changed to change the operating point of the internal combustion engine 2 before the internal combustion engine 2 is started is shown as one example in FIG. 15. In FIG. 15, a case where the gear position is changed from the second gear to the first gear before the internal combustion engine 2 is started is shown as an example. When it is determined at time t0 that the gear position of the automatic transmission gear device 10 needs to be changed, the gear position of the automatic transmission gear device 10 starts to be changed at time t1, and the gear position is changed from the second gear, in which the brake B1 is engaged, to the first gear, in which the brake B1 is disengaged and the brake B2 is engaged. During the period from time t1 at which the gear change is started to time t3 at which the gear change is completed, the motor rotational speed of the first motor 3 and the motor torque of the second motor 4 start to be controlled at time t2 to achieve synchronous control.

When the conditions for starting the internal combustion engine 2 are fulfilled at time t4, the engine speed is increased by increasing the motor rotational speed of the first motor 3 and causing the second motor 4 to receive a reaction force. When the engine speed reaches a predetermined speed at time t5, the internal combustion engine 2 is fired up. Then, start-up of the internal combustion engine 2 is completed at time t6. With the completion of start-up, the motor torque of the second motor 4 is reduced to reduce the reaction force. Here, the start-up of the internal combustion engine 2 can be referred as starting of the internal combustion engine 2. The start-up or the starting of the internal combustion engine 2 starts at time t4 and completes at time t6.

According to the above embodiment, whether it is necessary to change the gear position of the automatic transmission gear device 10 to change the operating point is determined based on the operating point change amount ΔPx and the duration Tc. Therefore, the operating point can be changed only by the power split mechanism 5, when the operating point change amount ΔPx is small and the duration Tc is relatively short as described above and there is no need to change the gear position of the automatic transmission gear device 10 to change the operating point because. Thus, because it is possible to avoid giving an uncomfortable feeling to the user by changing the gear position of the automatic transmission gear device 10 within a relatively short duration Tc, the vehicle 1 can provide improved comfort. In addition, because the duration Tc is set longer as the engine temperature of the internal combustion engine 2 is lower, deterioration of emission can be prevented effectively. Further, because a gear position that can provide the highest combined transmission efficiency is selected when the gear position of the automatic transmission gear device 10 is changed, it is possible to avoid a change to an inefficient gear position in starting of the internal combustion engine 2. This helps to prevent a decrease in fuel efficiency.

The invention is not limited to the above embodiment and can be implemented in various forms. While a lean burn engine that is equipped with a supercharger is used as the internal combustion engine of a vehicle in the above embodiment, the internal combustion engine start controller of the invention may be applied to a hybrid vehicle that is equipped with a natural aspiration engine that performs stoichiometric combustion. In addition, the range of application of the invention is not limited to the embodiment of the drive unit illustrated as long as a differential mechanism that can change the operating point of the internal combustion engine is provided in addition to a transmission gear mechanism. For example, the invention may be also applied to a hybrid vehicle that is equipped with a single motor generator.

What is claimed is:

1. A start system for a hybrid vehicle, the hybrid vehicle including an internal combustion engine, a differential mechanism, and a transmission gear mechanism, the internal combustion engine being connected to the differential mechanism, the transmission gear mechanism being provided in a power transmission path between the differential mechanism and driving wheels, the transmission gear mechanism being configured to be able to select one of a plurality of gear positions, the hybrid vehicle being configured to use at least one of the differential mechanism and the transmission gear mechanism to temporarily change an engine speed in starting of the internal combustion engine, the start system comprising:
an electronic control unit configured to determine a duration for which the engine speed needs to be changed in starting of the internal combustion engine, the electronic control unit being configured to determine a degree of change in the engine speed in starting of the internal combustion engine, and the electronic control unit being configured to determine whether the engine speed needs to be changed by changing the gear position of the transmission gear mechanism based on the degree and the duration.

2. The start system according to claim 1, wherein the electronic control unit is configured to determine the duration to be longer as an engine temperature of the internal combustion engine is lower.

3. The start system according to claim 1, wherein the electronic control unit is configured, when the electronic control unit determines that the engine speed needs to be changed by changing the gear position of the transmission gear mechanism, to determine one of the plurality of gear positions of the transmission gear mechanism as the gear position after the change of the engine speed, such that a combined transmission efficiency becomes the highest when the engine speed is changed in starting of the internal combustion engine,
the combined transmission efficiency is a value that is obtained by combining the transmission efficiency of the differential mechanism and the transmission efficiency of the transmission gear mechanism.

4. The start system according to claim 1, wherein the electronic control unit is configured to use the differential mechanism to change the engine speed temporarily in starting of the internal combustion engine, when the electronic control unit determines that there is no need to change the engine speed by changing the gear position of the transmission gear mechanism.

5. A start control method for a hybrid vehicle, the hybrid vehicle including an internal combustion engine, a differential mechanism, a transmission gear mechanism, and an electronic control unit, the internal combustion engine being connected to the differential mechanism, the transmission gear mechanism being provided in a power transmission path between the differential mechanism and driving wheels, the transmission gear mechanism being configured to be able to select one of a plurality of gear positions, the start control method comprising:
determining, by the electronic control unit, a duration for which an engine speed needs to be changed in starting of the internal combustion engine,
determining, by the electronic control unit, a degree of change in the engine speed in starting of the internal combustion engine,
determining, by the electronic control unit, whether the engine speed needs to be changed by changing the gear position of the transmission gear mechanism based on the degree and the duration, and
temporarily changing the engine speed by the differential mechanism in starting of the internal combustion engine, when it is determined by the electronic control unit that there is no need to change the engine speed by changing the gear position of the transmission gear mechanism.

\* \* \* \* \*